(12) United States Patent
Kato et al.

(10) Patent No.: US 9,879,763 B2
(45) Date of Patent: Jan. 30, 2018

(54) CHAIN GUIDE AND CHAIN TRANSMISSION DEVICE

(71) Applicants: NTN CORPORATION, Osaka (JP); BORGWARNER MORSE SYSTEMS JAPAN K.K., Mie (JP)

(72) Inventors: Akio Kato, Shizuoka (JP); Takahiro Yamashita, Shizuoka (JP); Hisataka Hasegawa, Shizuoka (JP); Shinji Tsuruta, Mie (JP); Hiroyuki Fukuyama, Mie (JP); Nobuhiro Mizuno, Aichi (JP)

(73) Assignees: NTN CORPORATION, Osaka (JP); BORGWARNER MORSE SYSTEMS JAPAN K.K., Mie (JP)

( * ) Notice: Subject to any disclaimer, the term of this patent is extended or adjusted under 35 U.S.C. 154(b) by 0 days.

(21) Appl. No.: 15/127,567

(22) PCT Filed: Mar. 27, 2015

(86) PCT No.: PCT/JP2015/059637
§ 371 (c)(1),
(2) Date: Sep. 20, 2016

(87) PCT Pub. No.: WO2015/147265
PCT Pub. Date: Oct. 1, 2015

(65) Prior Publication Data
US 2017/0152922 A1 Jun. 1, 2017

(30) Foreign Application Priority Data

Mar. 27, 2014 (JP) ................. 2014-066031

(51) Int. Cl.
*F16H 7/18* (2006.01)
*F16H 7/08* (2006.01)
*F16H 7/06* (2006.01)

(52) U.S. Cl.
CPC ................. *F16H 7/08* (2013.01); *F16H 7/06* (2013.01); *F16H 7/18* (2013.01);
(Continued)

(58) Field of Classification Search
CPC ........... F16H 2007/0874; F16H 7/1281; F16H 2007/0893; F16H 2007/081; F01L 1/348
(Continued)

(56) References Cited

U.S. PATENT DOCUMENTS 1,016,787 A * 2/1912 Sewall .......................... 474/109
1,579,245 A * 4/1926 Pennington .......... B62D 55/108
305/134

(Continued)

FOREIGN PATENT DOCUMENTS

DE 37 38 895 6/1989
DE 10 2004 027 064 12/2005
(Continued)

OTHER PUBLICATIONS

International Preliminary Report on Patentability and Written Opinion of the International Searching Authority dated Sep. 27, 2016 in corresponding International (PCT) Application No. PCT/JP2015/059637.

(Continued)

*Primary Examiner* — Henry Liu
(74) *Attorney, Agent, or Firm* — Wenderoth, Lind & Ponack, L.L.P.

(57) ABSTRACT

A chain guide includes a curved guide base extending along the direction in which a torque transmitting chain moves. The guide base includes, on its surface opposed to the chain, a rolling guide portion including a plurality of roller element bearings which are rotatable and configured to guide the chain while kept in rolling contact with the chain, and a sliding guide portion in the form of a curved surface. The (Continued)

rolling guide portion reduces a loss in torque transmission, while the sliding guide portion reduces flapping of the chain, thus reducing noise and vibrations of the chain.

10 Claims, 5 Drawing Sheets

(52) U.S. Cl.
CPC ............... *F16H 2007/0872* (2013.01); *F16H 2007/0893* (2013.01); *F16H 2007/185* (2013.01)

(58) Field of Classification Search
USPC .................................. 474/111, 134, 135, 140
See application file for complete search history.

(56) References Cited

U.S. PATENT DOCUMENTS

| | | | | | |
|---|---|---|---|---|---|
| 2,352,797 | A | * | 7/1944 | Miller | F16H 35/02 474/134 |
| 2,753,812 | A | * | 7/1956 | Wharton | B61D 43/00 105/105 |
| 3,391,807 | A | * | 7/1968 | Buschbom | F16H 7/1281 414/319 |
| 3,441,009 | A | * | 4/1969 | Rafanelli | F01L 1/348 123/90.15 |
| 3,785,219 | A | * | 1/1974 | Anthamatten | B62M 9/16 474/134 |
| 3,817,114 | A | * | 6/1974 | Klee | F16H 7/1281 474/110 |
| 3,941,006 | A | * | 3/1976 | Brodesser | F16H 7/1254 474/132 |
| 4,011,709 | A | * | 3/1977 | Mott | A01D 41/148 56/10.4 |
| 4,141,245 | A | * | 2/1979 | Brandstetter | G01L 3/247 474/109 |
| 4,416,647 | A | * | 11/1983 | White, Jr. | F16H 7/1281 474/134 |
| 4,511,348 | A | * | 4/1985 | Witdoek | F16H 7/12 474/109 |
| 4,525,151 | A | * | 6/1985 | Tomita | F16H 7/1281 123/90.15 |
| 4,530,682 | A | * | 7/1985 | Gruber | F16H 7/0827 474/133 |
| 4,685,429 | A | * | 8/1987 | Oyaizu | F01L 1/02 123/90.15 |
| 4,726,331 | A | * | 2/1988 | Oyaizu | F01L 1/348 123/90.15 |
| 4,758,208 | A | * | 7/1988 | Bartos | F16H 7/1281 474/111 |
| 4,981,116 | A | * | 1/1991 | Trinquard | F02B 67/06 123/90.31 |
| 5,221,236 | A | * | 6/1993 | Raymer | B62M 9/16 474/109 |
| 5,242,331 | A | * | 9/1993 | Konig | F16H 7/02 474/101 |
| 5,776,025 | A | * | 7/1998 | Labudde | F16H 7/1281 474/133 |
| 6,004,237 | A | * | 12/1999 | Lodico | F16H 7/1281 474/117 |
| 6,110,063 | A | | 8/2000 | Okabe et al. | |
| 6,155,218 | A | * | 12/2000 | Line | F01L 1/348 123/90.15 |
| 6,857,978 | B2 | * | 2/2005 | Polster | F16H 7/1209 474/134 |
| 6,857,979 | B2 | * | 2/2005 | Macnaughton | F16H 7/1218 474/101 |
| 7,678,000 | B2 | * | 3/2010 | Harnetiaux | F16H 7/1281 474/117 |
| 7,913,479 | B2 | * | 3/2011 | Eavenson, Sr. | A01D 34/76 474/135 |
| 9,140,338 | B2 | * | 9/2015 | Serkh | F16H 7/1218 |
| 9,400,046 | B2 | * | 7/2016 | Kato | F16H 7/18 |
| 2003/0176249 | A1 | * | 9/2003 | Polster | F16H 7/1209 474/134 |
| 2003/0224889 | A1 | * | 12/2003 | Luh | F16H 7/1281 474/134 |
| 2008/0070731 | A1 | * | 3/2008 | Vrsek | F01L 1/348 474/134 |
| 2011/0294612 | A1 | * | 12/2011 | Kato | F16H 7/08 474/91 |
| 2013/0312685 | A1 | | 11/2013 | Kato et al. | |
| 2013/0324339 | A1 | * | 12/2013 | Kato | F16H 7/18 474/137 |
| 2013/0331211 | A1 | * | 12/2013 | Kato | F16H 7/18 474/101 |
| 2014/0155208 | A1 | * | 6/2014 | Kato | F02B 67/06 474/111 |
| 2014/0162820 | A1 | | 6/2014 | Kato et al. | |
| 2014/0179472 | A1 | | 6/2014 | Kato et al. | |
| 2014/0274512 | A1 | * | 9/2014 | Oishi | F16H 7/18 474/139 |

FOREIGN PATENT DOCUMENTS

| | | |
|---|---|---|
| EP | 2 302 260 | 3/2011 |
| JP | 2012-189200 | 10/2012 |
| JP | 2013-2467 | 1/2013 |
| JP | 2013-24314 | 2/2013 |
| JP | 2013-32826 | 2/2013 |
| JP | 2013-108612 | 6/2013 |
| WO | 2010/090139 | 8/2010 |

OTHER PUBLICATIONS

International Search Report dated Jun. 23, 2015 in corresponding International (PCT) Application No. PCT/JP2015/059637.
Extended European Search Report dated Jun. 13, 2017 in European Application No. 15767946.5.

* cited by examiner

CHAIN GUIDE AND CHAIN TRANSMISSION DEVICE

TECHNICAL FIELD

The present invention relates to a chain guide used to adjust the tension of a torque transmitting chain, or to guide the movement of this chain, and a chain transmission device using such a chain guide.

BACKGROUND ART

A cam driving chain transmission device includes a timing chain (hereinafter simply referred to as the "chain") trained around a driving sprocket mounted on a crankshaft and a driven sprocket mounted on a camshaft. Such a chain transmission device further includes a chain guide pivotally provided on one side of the slack side of the chain to extend in the moving direction of the chain, and a chain tensioner for applying an adjusting force to the remote end portion of the chain guide remote from the center of pivoting motion of the chain guide, thereby tensioning the timing chain, and thus preventing loosening and flapping of the chain.

Such a chain transmission device may further include a fixed chain guide on the tension side of the chain to guide the movement of the chain to more effectively prevent flapping of the chain.

Known chain guides for adjusting the tension of the chain or for guiding the movement of the chain includes those of the type which guide the chain whiling being in sliding surface contact with the chain. However, such chain guides offer a large resistance to the movement of the chain, and thus increases a loss in torque transmission.

In order to avoid this problem, International Application Publication 2010/090139 proposes a chain guide including a guide base made of a synthetic resin and elongated in the direction of movement of the chain, a plurality of roller shafts having both ends thereof supported on the guide base so as to be arranged along a curved line, and rollers comprising roller bearings rotatably supported by the respective roller shafts, whereby the chain is movably guided by the rollers.

With this chain guide, since the plurality of rollers guide the chain while in rolling contact with the chain, the resistance to movement of the chain is small and thus a loss in torque transmission is small.

In the chain guide of International Application Publication 2010/090139, the chain is stretched in a straight line at its portions between the adjacent rollers, and is bent at its portions coming into contact with the respective rollers. Since the chain is stretched in a straight line every time after being bent, the chain tends to flap, thus producing noise and vibrations. It is desired to reduce such noise and vibrations.

An object of the present invention is to provide a chain guide which is capable of minimizing noise and vibrations of the timing chain, while minimizing a loss in torque transmission.

In order to achieve this object, the present invention provides a chain guide comprising a curved guide base extending along a direction in which a torque transmitting chain moves. The guide base includes, on a surface of the guide base opposed to the chain, a rolling guide portion comprising a plurality of rollers which are rotatable and configured to guide the chain while being kept in rolling contact with the chain, and at least one sliding guide portion comprising a curved surface.

The present invention also provides a chain transmission device comprising a chain trained around a driving sprocket and a driven sprocket, a chain guide as described herein (i.e., of the present invention) pivotally provided on one side of the slack side of the chain, and configured to guide a movement of the chain, and a chain tensioner configured to apply an adjusting force to an end portion of the chain guide spaced apart from a center of pivoting motion of the chain guide, thereby pressing said end portion against the chain.

In order to more effectively reduce flapping of the chain, this chain transmission device preferably further includes a fixed chain guide according to the present invention which is provide on one side of the tension side of the chain to guide the movement of the chain.

As described above, since the chain guide according to the present invention includes a rolling guide portion for guiding the chain while being in rolling contact with the chain, and a sliding guide portion comprising a curved surface, the chain is guided by the rolling guide portion while being in rolling contact with the rolling guide portion. This reduces a loss in torque transmission. Further, since the chain is guided by the sliding guide portion while kept in sliding contact with the sliding guide portion, and while maintaining a constant radius of curvature, the chain is less likely to flap and thus produces less vibrations and noise.

When the chain enters one end of the curved guide base, the chain, which has been moving in a straight line, is bent so as to have a radius of curvature. When the chain leaves the guide base from the other end thereof, the chain, which has been moving along a curved line with a radius of curvature, now begins to move in a straight line. Thus, the chain tends to vibrate both when entering the guide base from the one end thereof and when leaving the guide base from the other end thereof.

The tension of the timing chain fluctuates due to fluctuations in torque of the driving sprocket, which is mounted to the crankshaft, when the engine explodes, and due to fluctuations in torque of the driven sprocket, which is mounted to a camshaft, when the intake and exhaust valves are pushed in. Thus, the chain tends to vibrate more violently at its portions near the driving and driven sprockets. If, as in the conventional arrangement, the chain is in sliding contact with the guide base, this means that the chain is in surface contact with the guide, while if the former is in rolling contact with the latter, this means that the former is in line contact with the latter. Thus, if the chain and the guide base are in sliding contact with each other, the contact surface area is larger than if the chain and the guide base are in rolling contact with each other, so that the guide base can more stably guide the chain, and thus more effectively reduce vibrations.

For this reason, the at least one sliding guide portion is preferably provided at one of the end of the guide base at which the chain enters the guide base, and the end of the guide base at which the chain leaves the guide base, in order to effectively reduce vibrations of the chain with the sliding guide portion.

The guide base of a camshaft-driving chain transmission device is small in radius of curvature at its portion close to the crankshaft or to the camshaft, and a large load is applied from the chain to this portion, i.e., the portion which is small in radius of curvature. Also, a larger load is applied to the end portion of the guide base which is pressed by the chain tensioner than to its end portion about which the guide base pivots. By providing the rolling guide portion at such a portion of the guide base, i.e., the portion to which a large load is applied from the chain, it is possible to smoothly guide the chain while in rolling contact with the chain, and thus to effectively reduce a loss in torque transmission.

The at least one sliding guide portion of the chain guide according to the present invention may comprise a plurality of sliding guide portions disposed between the respective adjacent pairs of the rollers, which constitute the rolling guide portion. With this arrangement, the chain can be guided while being in sliding contact with the sliding guide portions and in rolling contact with the rolling guide portion, and while maintaining a constant radius of curvature. Therefore, it is possible to effectively reduce vibrations of the chain.

By providing the sliding guide portions at lower levels than the portions of the rolling guide portion which contact the chain, the chain is guided by the sliding guide portions, while being in sliding contact with the sliding guide portions, only when the chain vibrates. This reduces the resistance to movement of the chain, and thus effectively minimizes a loss in torque transmission.

Advantages of the Invention

According to the present invention, by providing the guide base with a rolling guide portion and at least one sliding guide portions, it is possible to effectively reduce vibrations of the chain, thus also effectively reducing its noise, while minimizing a loss in torque transmission.

DETAILED DESCRIPTION OF THE INVENTION

Figure 1:
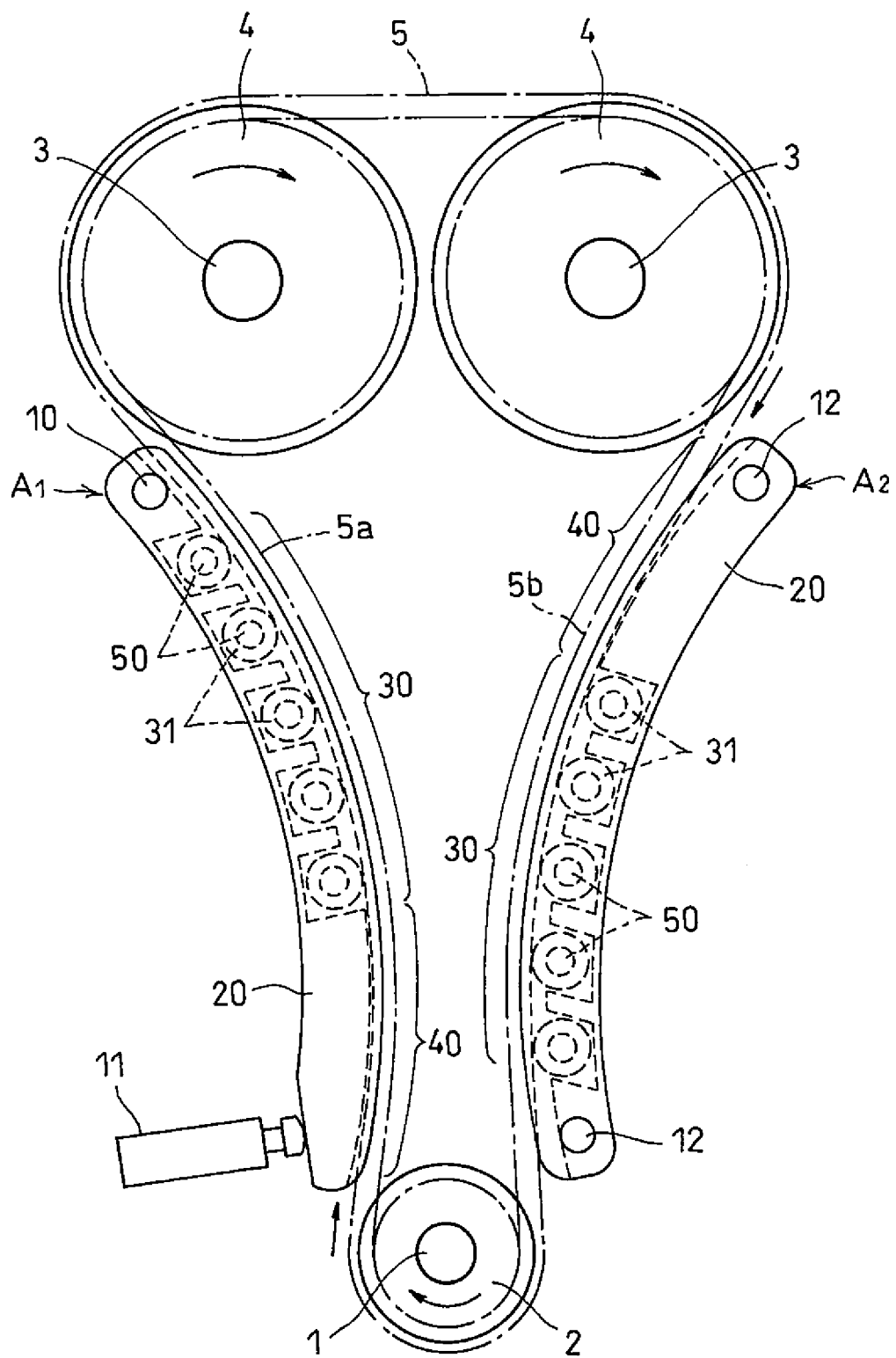
FIG. 1 schematically shows a chain transmission device embodying the present invention.
Figure 2:
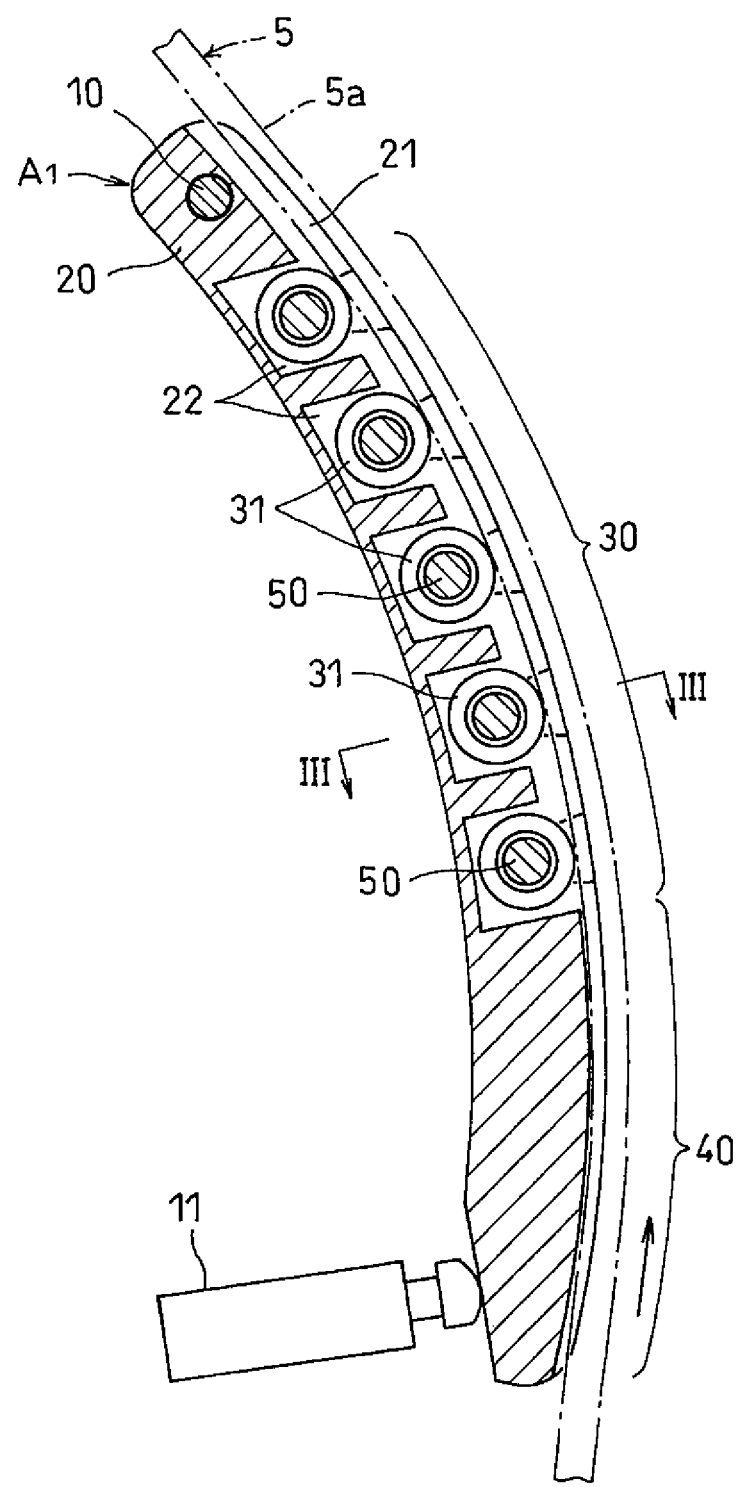
FIG. 2 is a longitudinal sectional view of a chain guide shown in FIG. 1.
Figure 3:
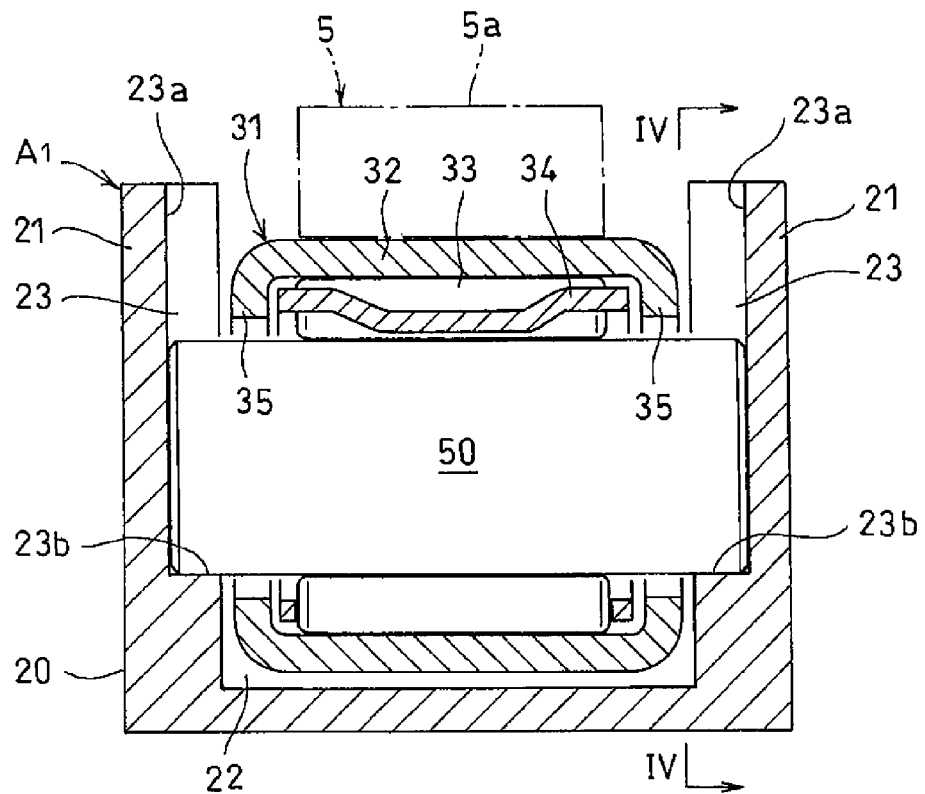
FIG. 3 is a sectional view taken along line III-III of FIG. 2.
Figure 4:
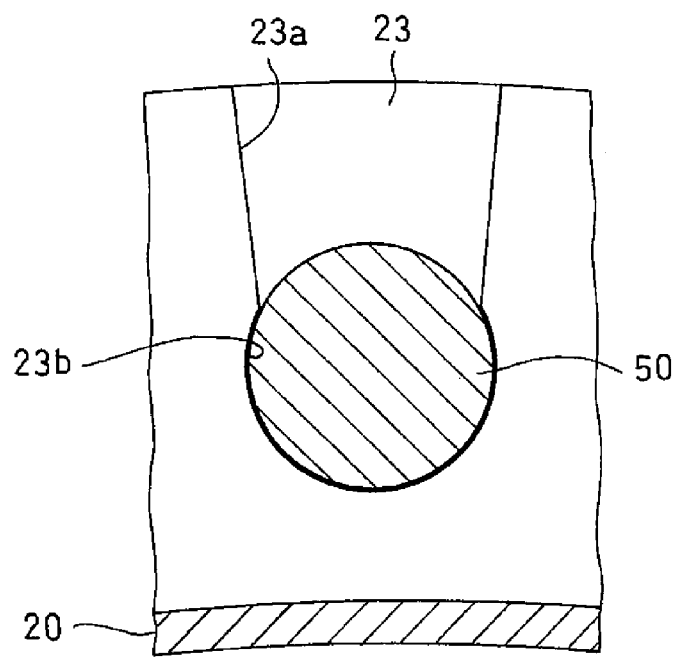
FIG. 4 is a sectional view taken along line IV-IV of FIG. 3.

Now the embodiment of the present invention is described with reference to the drawings. FIG. 1 shows a chain transmission device for driving camshafts, which includes a driving sprocket 2 mounted to an end of a crankshaft 1, driven sprockets 4 mounted to ends of camshafts 3, and a timing chain 5 trained around the driving sprocket 2 and the driven sprockets 4.

The timing chain 5 may be a roller chain or a silent chain.

The crankshaft 1 rotates in the direction of the arrow in FIG. 1. When the crankshaft 1 rotates in this direction, the timing chain (hereinafter simply referred to as the "chain") 5 moves in the direction shown by the arrows in FIG. 1. Thus, the portion of the chain 5 moving upward becomes slack (thus hereinafter referred to as the "slack side 5a"), and its portion moving downward is tensioned (thus referred to as the "tension side 5b"). A chain guide $A_1$ is provided on one side of the slack side 5a of the chain 5, while a chain guide $A_2$ is provided on the other side of the tension side 5b of the chain 5.

The chain guide $A_1$, provided on the one side of the slack side 5a of the chain 5, includes a curved guide base 20 elongated in the direction in which the chain 5 moves. The guide base 20 is arranged such that its convex curved surface is opposed to the chain 5, and is supported by a pivot shaft 10 at its upper end portion, i.e., its end portion on the side of the camshaft 3 so as to be pivotable about the pivot shaft 10.

A chain tensioner 11 applies an adjusting force to the lower end portion of the guide base 20, i.e., its end portion on the side of the crankshaft 1, thus pressing the lower end portion against the slack side 5a.

A chain guide $A_1$ further includes, on the respective sides of the convex curved surface of the guide base 20, which faces the chain 5, a pair of guide ribs 21 extending in the longitudinal direction of the guide base 20. The chain guide $A_1$ has a rolling guide portion 30 which guides the chain 5, while in rolling contact with the chain 5, and a curved sliding guide portion 40 which guides the chain 5, while in sliding contact with the chain 5. The rolling guide portion 30 extends from the top end of the convex curved surface between the pair of guide ribs 21 to a borderline between the rolling guide portion 30 and the sliding guide portion 40. The borderline is located slightly below the longitudinal center of the convex curved surface, and the sliding guide portion 40 extends downwardly from the borderline.

The rolling guide portion 30 is constituted by a plurality of rollers 31 spaced apart from each other in the longitudinal direction of the guide base 20. Each roller 31 is received in one of roller receiving recesses 22 formed in the guide base 20, and is supported by a roller shaft 50 having its respective ends supported by opposed side walls of the roller receiving recess 22 so as to be rotatable about the roller shaft 50.

The guide base 20 is formed of a synthetic resin which is preferably a synthetic resin which is high in oil resistance, weather resistance, and strength. Such synthetic resins include polyamide 46 (PA 46), and polyamide 66 (PA 66). For increased mechanical strength, the synthetic resin is preferably reinforced with glass fibers mixed therein.

The rollers 31 are roller element bearings each comprising an outer race 32, a plurality of roller elements 33 mounted in the outer race 32, and a retainer 34 retaining the roller elements 33.

The outer race 32 is a shell type member formed by drawing a metal plate made of e.g., SPC or SCM, and is subjected to heat treatment for increased hardness. The shell type outer race 32 is formed with inwardly extending flanges 35 at the respective ends thereof, to prevent the retainer 34 from being pulled out. For easy assembly of the roller element bearing 31, the inwardly extending flanges 35 are formed by bending after mounting the retainer 34 for retaining the roller elements 33 in position.

The roller element bearings 31 may be needle roller element bearings, or cylindrical roller element bearings. The roller element bearings 31 are arranged along the convex curved surface on the outer periphery of the guide base 20 to define a curved surface.

The roller shafts 50, which rotatably support the respective roller element bearings 31, are straight shafts and are made of a material such as SUJ2 or SC. For increased hardness and thus improved wear resistance, the roller shafts 50 are subjected to heat treatment. As such heat treatment, bright hardening is used here, but induction hardening, carburizing, or carbonitriding may be used instead.

The roller shafts 50 have their ends supported by shaft engaging portions 23 formed on the opposed inner side surfaces of the roller receiving recesses 22.

The shaft engaging portions 23 each comprise a tapered groove section 23a which opens to the outer surface of the guide rib 21 and tapered such that its width gradually increases toward the opening, and a circular shaft support section 23b communicating with the narrow end of the tapered groove section 23a.

The ends of the roller shafts 50 are inserted through the tapered groove sections 23a of the respective shaft engaging portions 23 and fitted into their shaft support sections 23b such that the roller shafts 50 are not rotatable. The narrow ends of the tapered groove sections 23a have widths smaller than the diameters of the roller shafts 50, thereby preventing the roller shafts 50 from being pulled out of the shaft support sections 23b.

The sliding guide portion 40 comprises a curved surface portion formed on the guide base 20. The curved surface portion forming the sliding guide portion 40 is smoothly connected to a curved line that passes through one point of the outer periphery of each of the roller element bearings 31.

In the embodiment, the sliding guide portion 40 is directly formed on the guide base 20, but may be in the form of a separate member which is high in sliding properties and wear resistance and fixed to the guide base 20.

As shown in FIG. 1, the chain guide $A_2$, which is provided on the other side of the tension side 5b of the chain 5, is elongated in the direction in which the chain 5 moves, and is fixed at its respective end portions to an engine block by bolts 12 threaded into the engine block, to guide the movement of the chain 5.

This fixed chain guide $A_2$, and the chain guide $A_1$, which is pivotally provided on the one side of the slack side 5a of the chain, are identical in structure, but differs from each other in that the pivotable chain guide $A_1$ is arranged such that the rolling guide portion 30 is located at the upper portion of the chain guide, while the chain guide $A_2$ is arranged such that, conversely to the chain guide $A_1$, the sliding guide portion 40 is at the upper portion of the chain guide.

Thus, elements of the fixed chain guide $A_2$ that are identical to those of the pivotable chain guide $A_1$ are denoted by identical numerals, and their description is omitted.

With the chain transmission device of the embodiment, while the chain 5 trained around the driving sprocket 2 and the driven sprockets 4 is moving to transmit the rotation of the crankshaft 1 to the camshafts 3, the tension of the chain 5 fluctuates due to fluctuations in load applied to the chain 5. However, since the chain tensioner 11 removes such fluctuations in tension of the chain 5, the tension of the chain 5 is always kept at a constant level.

While the rotation of the crankshaft 1 is being transmitted to the camshafts 3, the roller element bearings 31 of the pivotable chain guide $A_1$ and the fixed chain guide $A_2$ rotate due to contact with the chain 5. In other words, the chain 5 is guided by the roller element bearings 31 while being kept in rolling contact with the roller element bearings 31. This reduces a loss in torque transmission.

On the other hand, the chain 5 is guided by the sliding guide portion 40 of the guide base 20 of each chain guide $A_1$, $A_2$, while being kept in sliding contact with the sliding guide portion 40, and while maintaining a constant radius of curvature. This reduces flapping of the chain, and its vibrations and noise.

Since the chain 5 is partially guided while being kept in rolling contact with the chain guide and partially guided while being kept in sliding contact with the chain guide, it is possible to reduce noise and vibrations while minimizing a loss in torque transmission.

When the chain 5 enters one end of the curved guide base 20 of each chain guide $A_1$, $A_2$, the chain 5, which has been moving in a straight line, is bent so as to have a radius of curvature. This tends to cause vibrations of the chain 5. However, by providing the sliding guide portion 40 at the end of the guide base 20 of each of the pivotable chain guide $A_1$ and the fixed chain guide $A_2$ at which the chain 5 enters, the sliding guide portion 40 reduces vibrations of the chain 5, thus also effectively reducing noise of the chain 5.

When the chain 5 leaves the guide base 20 from the other end thereof, the chain 5, which has been moving along a curved line with a radius of curvature, now begins to move in a straight line. Thus, the chain 5 also tends to vibrate when leaving the guide base 20 from the other end thereof.

Figure 5:
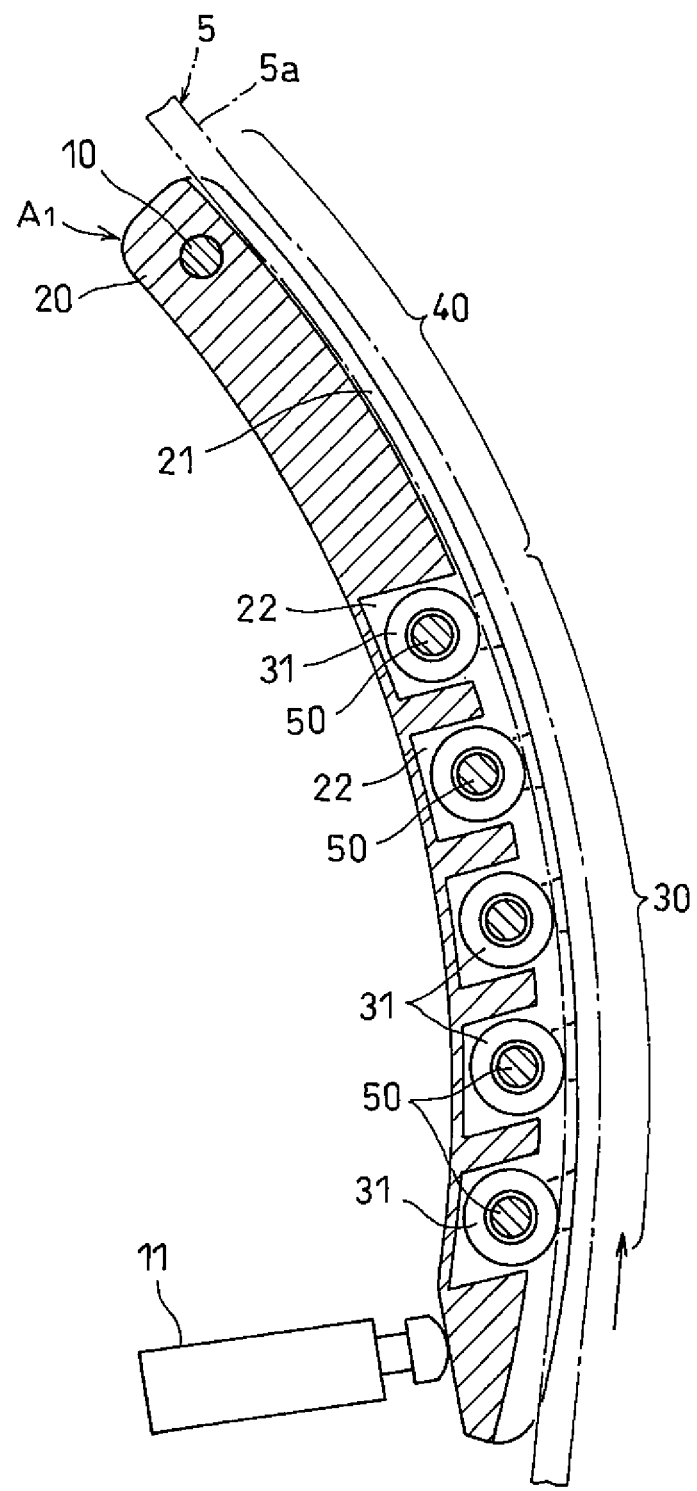
FIG. 5 is a sectional view of a different chain guide.

By providing, as shown in FIG. 5, the sliding guide portion 40 at the other end of the guide base 20, from which the chain 5 leaves the guide base 20, it is possible to reduce the vibration of the chain 5, thus also effectively reducing noise of the chain 5, at the other end of the guide base 20.

In the camshaft driving chain transmission device, each guide base 20 is smaller in radius of curvature at its portion close to the crankshaft 1, so that a large load is applied from the chain 5 to the portion of the guide base 20 smaller in radius of curvature. Also, a larger load is applied from the chain 5 to the portion of the guide base 20 which is close to its end portion pressed by the chain tensioner 11 than to its end portion about which the guide base 20 pivots.

In the embodiment shown in FIG. 5, the rolling guide portion 30 is provided at the portion of the guide base 20 which is pressed by the chain tensioner 11, which is on the side of the crankshaft 1, and on which, as a result, a large load is applied. This makes it possible to smoothly guide the chain 5 while kept in rolling contact with the rollers, and thus to effectively reduce a loss in torque transmission.

Figure 6:
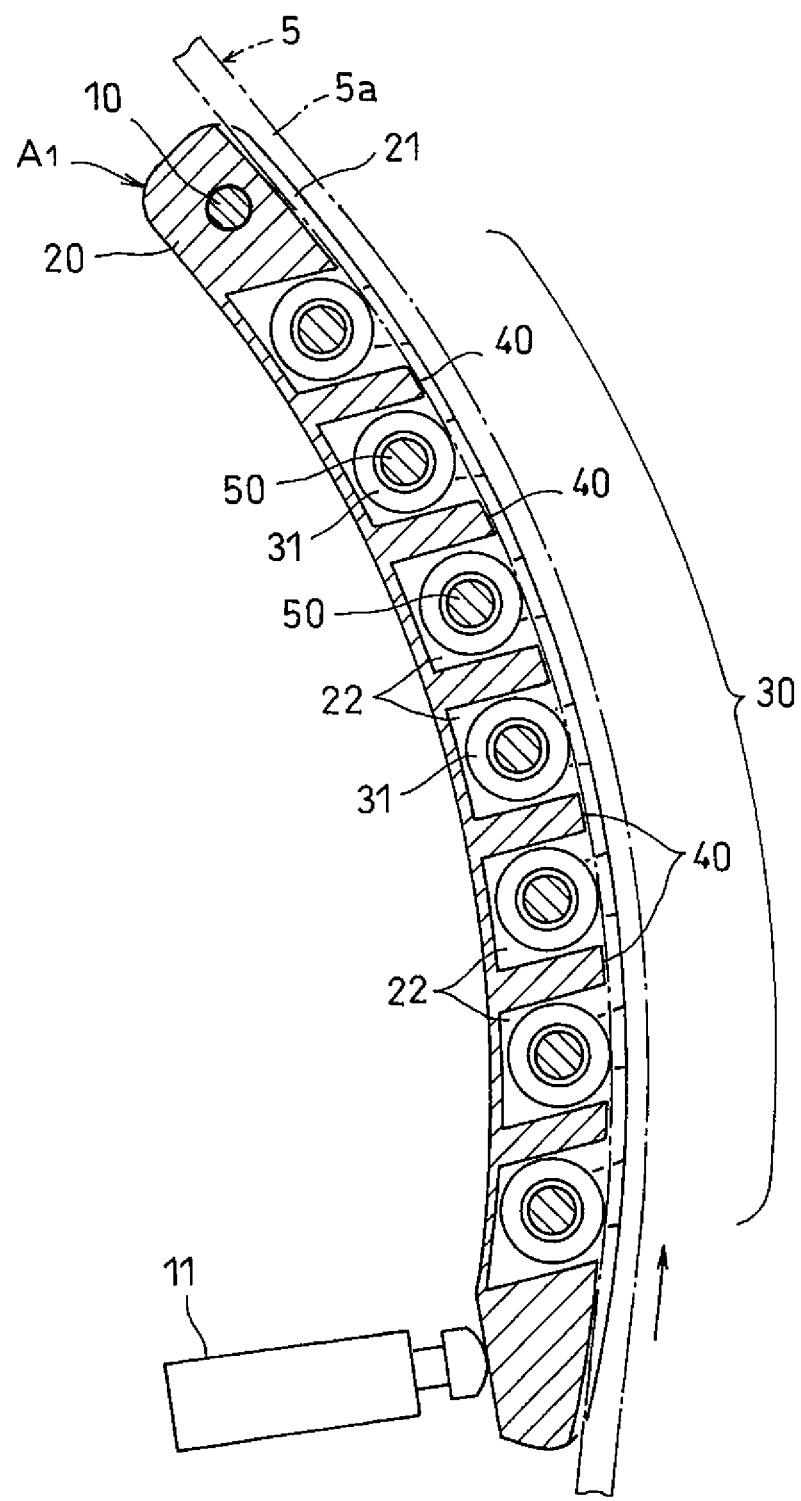
FIG. 6 is a sectional view of a still different chain guide.

FIG. 6 shows a chain guide $A_1$ of another embodiment, in which sliding guide portions 40 are provided between the respective adjacent ones of the roller element bearings 31, which form the rolling guide portion 30.

By providing, as shown in FIG. 6, sliding guide portions 40 between the adjacent roller element bearings 31, the chain 5 can be guided with its radius of curvature constant, while being partially in sliding contact and partially in rolling contact, with the guide base 20. Thus, it is possible to effectively reduce vibrations of the chain 5.

By providing the sliding guide portions 40 at lower levels than the portions of the rolling guide portion 30 which contact the chain 5, the chain 5 is guided by the sliding guide portions 40, while being in sliding contact with the sliding guide portions 40, when the chain 5 vibrates. This reduces the resistance to movement of the chain 5, and thus effectively minimizes a loss in torque transmission.

DESCRIPTION OF THE NUMERALS $A_1$. Chain guide
$A_2$: Chain guide
2. Driving sprocket
4. Driven sprocket
5. Timing chain (torque transmitting chain)
20. Guide base
30. Rolling guide portion
31. Roller element bearing (roller)
40. Sliding guide portion

What is claimed is:
1. A chain guide comprising:
a curved guide base extending along a direction in which a torque transmitting chain moves, the guide base including:
on a surface of the guide base opposed to the torque transmitting chain, a rolling guide portion compris- ing a plurality of rotatable rollers configured to guide the torque transmitting chain while being kept in rolling contact with the torque transmitting chain, and at least one sliding guide portion comprising a curved surface configured to guide the torque transmitting chain while in sliding contact with the torque transmitting chain.

2. The chain guide of claim 1, wherein the at least one sliding guide portion is provided at one of a first end of the guide base at which the torque transmitting chain enters the guide base, and a second end of the guide base at which the torque transmitting chain leaves the guide base.

3. The chain guide of claim 1, wherein the rolling guide portion is provided at a portion of the guide base to which a load is applied from the torque transmitting chain.

4. The chain guide of claim 1, wherein the at least one sliding guide portion comprises a plurality of sliding guide portions disposed between respective adjacent pairs of the rollers constituting the rolling guide portion.

5. The chain guide of claim 4, wherein the sliding guide portions are provided at lower levels than portions of the rolling guide portion which contact the torque transmitting chain.

6. A chain transmission device comprising a chain trained around a driving sprocket and a driven sprocket, the chain guide of claim 1 pivotally provided on one side of a slack side of the chain, the chain guide being configured to guide a movement of the chain, and a chain tensioner configured to apply an adjusting force to an end portion of the chain guide spaced apart from a center of pivoting motion of the chain guide, thereby pressing said end portion against the chain.

7. The chain transmission device of claim 6, wherein the at least one sliding guide portion is provided at one of a first end of the guide base at which the torque transmitting chain enters the guide base, and a second end of the guide base at which the torque transmitting chain leaves the guide base.

8. The chain transmission device of claim 6, wherein the rolling guide portion is provided at a portion of the guide base to which a load is applied from the torque transmitting chain.

9. The chain transmission device of claim 6, wherein the at least one sliding guide portion comprises a plurality of sliding guide portions disposed between respective adjacent pairs of the rollers constituting the rolling guide portion.

10. The chain transmission device of claim 9, wherein the sliding guide portions are provided at lower levels than portions of the rolling guide portion which contact the torque transmitting chain.

* * * * *